United States Patent [19]

Baird et al.

[11] 4,170,813

[45] Oct. 16, 1979

[54] CLAMP FOR STRAPPING INGOT MOULDS

[75] Inventors: Robert A. Baird, Whitley Bay; James E. Baird, Gosforth, both of England

[73] Assignee: J. O. & R. H. Baird Limited, Newcastle upon Tyne, England

[21] Appl. No.: 745,420

[22] Filed: Nov. 26, 1976

[51] Int. Cl.² .......................................... B23K 37/04
[52] U.S. Cl. ................................. 29/281.3; 29/281.4; 269/26; 269/287
[58] Field of Search ............... 228/173, 178; 29/281.1, 29/281.4, 281.5, 281.6, 281.3; 72/387; 100/26; 269/25, 26, 152, 287

[56] References Cited

U.S. PATENT DOCUMENTS

| | | | |
|---|---|---|---|
| 2,304,493 | 12/1942 | Bullock | 269/26 |
| 2,682,908 | 7/1954 | Schultz | 269/26 |
| 2,800,867 | 7/1957 | Smith | 269/152 X |
| 3,234,870 | 2/1966 | Missioux | 100/26 |
| 3,561,750 | 2/1971 | Woodrum | 29/281.1 X |
| 3,805,355 | 4/1974 | Gornik | 29/281.4 |
| 3,920,232 | 11/1975 | Clark | 269/25 |

Primary Examiner—Lowell A. Larson
Assistant Examiner—K. J. Ramsey
Attorney, Agent, or Firm—Edward B. Gregg; J. Michael Rosso

[57] ABSTRACT

A method and apparatus for strapping ingot moulds by forcing roughly pre-formed strap sections into pressure contact around the mark of the mould which is to be strapped, and welding the joints between the sections to form a complete strap. The apparatus includes the frame, with two generally C-shaped portions hinged together to form a bar which can be closed around a mould, the frame carrying hydraulic rams at spaced intervals for pressing the strap sections against the mould.

2 Claims, 7 Drawing Figures

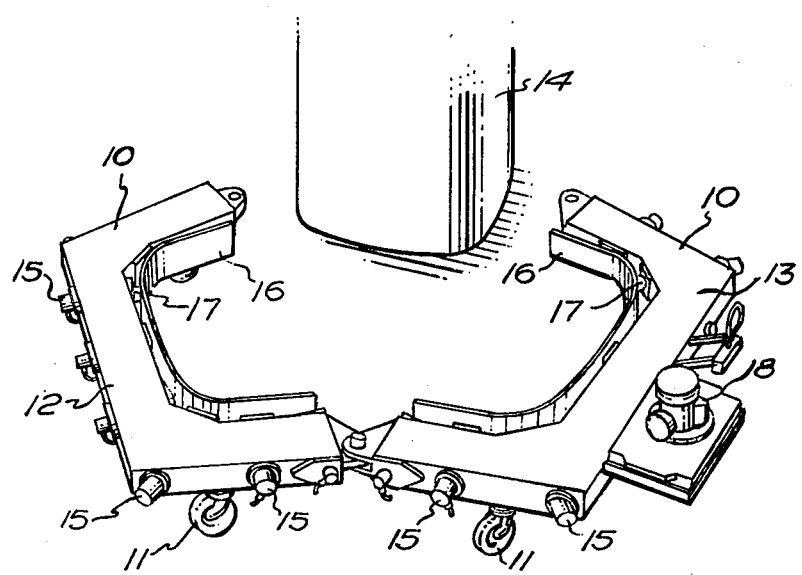
FIG.1
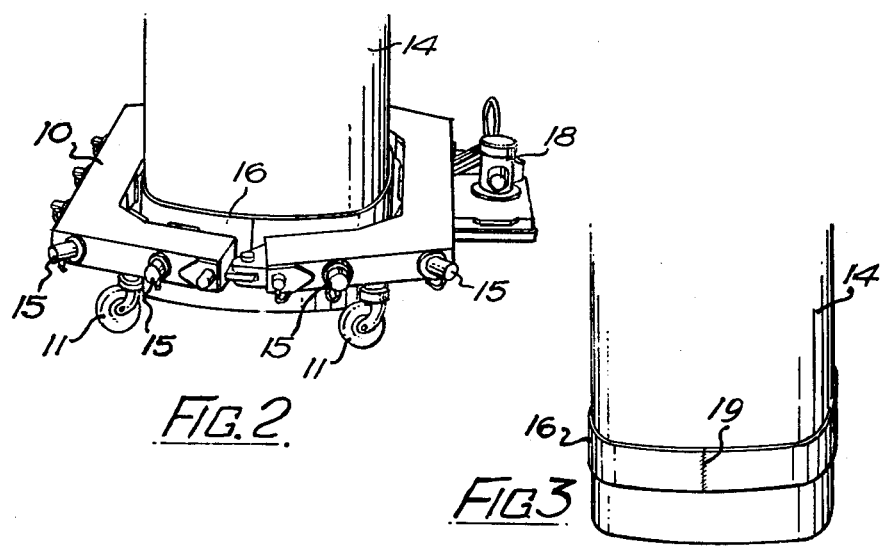
FIG.2
FIG.3

CLAMP FOR STRAPPING INGOT MOULDS

This invention relates to a method and apparatus for strapping ingot moulds.

Ingot moulds consist essentially of a hollow cylinder, having massive walls of several inches thickness. The walls are prone to the formation of cracks, especially near the base of the mould due to thermal stresses occuring on the pouring-in of molten metal.

It has become the practice to attempt to prolong the useful life of an ingot mould by strapping the mould. This involves the formation of a band about the outside of the mould to inhibit the formation or widening of cracks and thus to increase the life, and safety of the mould. In the prior method, four sections of a steel band are fixed onto the mould by means of belts, which method involves the boring of holes through the walls of the mould to accommodate the belts. The sections are butt welded to form a complete band or strap extending completely around the mould, the strap having four weld joints, near to the corners of the mould.

An object of this invention is to provide a method and an apparatus for the strapping of moulds which will enable the strapping operation to be carried out more economically than heretofore, and which will not involve any weakening interference with the mould wall.

This invention provides, from a first aspect, a method for strapping ingot moulds, comprising applying two or more strap sections to the outer mould surface, pressing the sections to lie around and conform to the outer mould surface in a pressure fit thereon, and welding the ends of the sections while pressed against the outer surface of the mould in such pressure fit, to form a continuous strap extending around the outer surface of the mould, in a pressure fit there around.

The pressure may be exerted sequentially on adjacent parts of each of the strap sections, to progressively force the strap section to lie against the outer surface of the mould, for example to bend the strap around corners of the mould.

Preferably, two strap sections may be used and these may be preformed to a general 'U' shape to minimise the work to be done in forcing the strap sections to conform to the outer surface of the mould.

From another aspect, the invention provides apparatus for strapping an ingot mould, comprising means for holding two or more strap sections to the outer surface of a mould and means for pressing the sections against the outer surface of the mould to lie around and conform to the outer mould surface in a pressure fit thereon.

Welding of the joints between the strap sections will ordinarily be carried out by mobile welding equipment, and will not form part of the apparatus of the invention.

The means for holding the strap sections to the outer surface of the mould, and for pressing the sections against the surface, may comprise hydraulic jacks or rams provided separately with suitably shaped supports or retaining members to hold the strap sections.

These jacks or rams may be adapted to be operated successively to progressively force the strap sections to lie against and conform with the outer surface of the mould, for example to bend the strap around the corners of the mould.

The jacks or rams may be mounted on a frame surrounding the base of the mould. The mould may be supported on a base which may be formed as slab of concrete on a work area floor. In the former case, the jacks may be removable from the frame for location on another similar frame, and in the latter case, the frame with the jacks, may be lowered onto and/or moved over the base unit around the mould.

A preferred embodiment of apparatus for strapping ingot moulds in accordance with the invention, and a preferred method of strapping ingot moulds according to the invention, will now be further described by way of example with reference to the accompanying drawings, wherein:

FIG. 1 shows apparatus according to the invention ready to embrace a mould;

FIG. 2 shows the apparatus in the operative position;

FIG. 3 shows a mould after it has been strapped using the apparatus;

Figure 4:
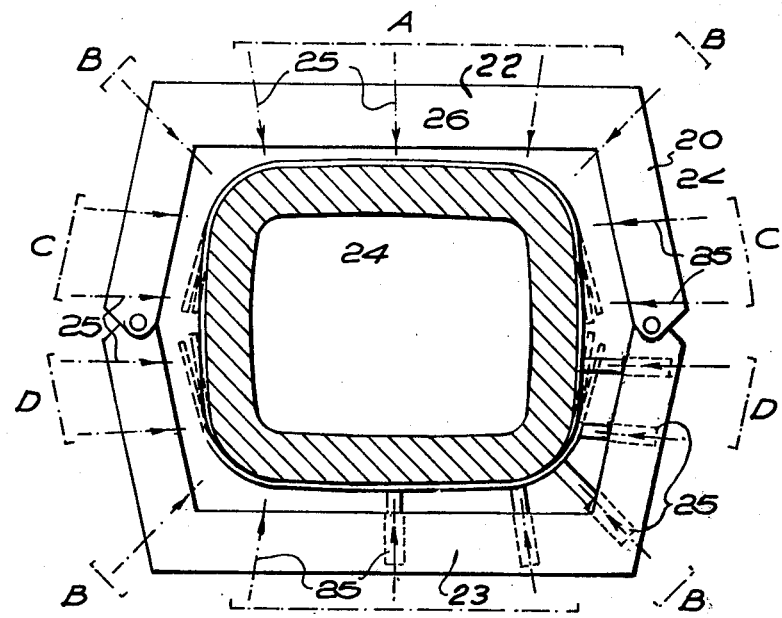
FIG. 4 is a plan view of a second embodiment of apparatus according to the invention closed around a mould.

The apparatus for strapping ingot moulds comprises a frame 10 which is raised above the level of the ground or floor of the work area and forms a poly, e.g. pentagonal structure. The frame 10 is supported on trunnions 11 by supports of the requisite height and comprises two jaws 12, 13 formed of box beams within which hydraulic jacks are positioned. The frame 10 is designed to open at one side like jaws to embrace a mould 14, after which it is clamped shut. The frame 10 is moved on the casters 11 from one mould 14 to the next. The jacks 15 when in location, are positioned with their plungers extending inwardly towards the position occupied by an ingot mould 14. The jacks 15 which are positioned to face the corners of the mould 14 are jacks 15 which are capable of exerting a pressure of up to 25 tons per square inch, and the jacks 15 which are positioned to face the faces of the mould 14 are capable of exerting a pressure of up to 10 tons per square inch. The higher pressure of the corner jacks 15 is required to accomplish the bending necessary to force a strap section 16 to conform to the bend of the mould.

The ends of the plungers of the jacks are adapted by means of pads or plates 17 to bear on the strap sections 16, and can be formed with a lip, of lesser height than the thickness of the strap sections, to support the underside of the strap sections. A pump 18 supplies pressure fluid to the jacks.

In use, and in accordance with the preferred method according to the invention, an ingot mould 14 is embraced by and appropriately centered with respect to the frame 10. The strap sections 16, preformed to a suitable 'U' shape are applied to the desired zone around the base of the ingot mould 14, and retained in position by the jacks 14 under sufficient pressure to hold the sections without slipping. The jacks are then operated, in accordance with a programe, and the jacks 15 holding each strap section are raised to full pressure in turn.

The 'U'shaped strap sections 16 each extend along the length of one side of the mould, around the corresponding corners and half way along the contiguous sides, at which points, the sections should abut. In this arrangement, the jacks 15 holding a strap seciton 16 are actuated in sequence beginning with the jack or jacks holding the zone of the strap section mid-way along the length of the said one side, and then each of the next adjacent jacks, the 25 ton corner jacks, and then the jacks holding the parts of the section against the contiguous sides. The raising of the jacks in turn to full pressure forces the strap secton to lie against the surface of the mould, and accomplishes any bending required to achieve the desired pressure fit.

The ends of the strap sections are welded together as at 19 (FIG. 3) while still subjected to the full pressure of the jacks, so that a complete strap is formed extending around the ingot mould, which is a pressure fit there around.

The whole frame 10 is removed after completion of the strapping operation and similarly closed about another mould 14. Thus a single frame may serve for several moulds.

A second embodiment of apparatus according to the invention is shown in FIGS. 4 to 7. A frame 20 is shown in position about a mould 24, two jaws 22, 23 of the frame 20 being closed by clevis pins at each side. In moving the frame 20 around the mould, one clevis pin is used as a pivot for the jaws 22, 23 which are opened to embrace the mould 24, and the second clevis pin is inserted to retain one closed frame 20. The frame 20 is mounted for ease of movement on trunnions (not shown).

The frame 20 carries a plurality of rams 25, which are carried within the frame which is of box construction. The plungers of the rams 25 are shown in contact with a pair of generally ill-shaped straps sections 26, the bases being held against the mould 24 under pressure, to begin with, and the "legs" forced progressively to lie against the mould, as indicated by the broken line portions shown in FIG. 4. The rams 25 are controlled in four groups. The rams of group 'A' are operated first to hold the strap section 26 in the base of the 'U' shape against the longer sides of the mould wall, group B are operated next to bend the corners of the strap sections, 26 about the corners of the mould 24, and groups C and D are then actuated in turn to press the 'legs' of the strap sections against the shorter sides of the mould wall. Where the strap sections are to be butt-welded, the groups C and D can be actuated together, but in order to obtain a better join, the joins may be stepped, in which case, the group C rams associated with the section with lower element of the stepped join, is actuated first.

Figure 5:
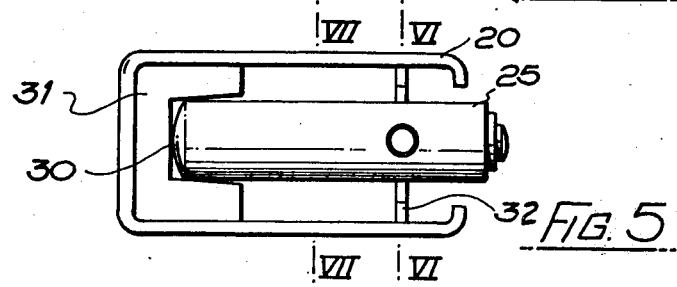
FIG. 5 is a longitudinal sectional view of one ram and its associated support.
Figures 6, 7:
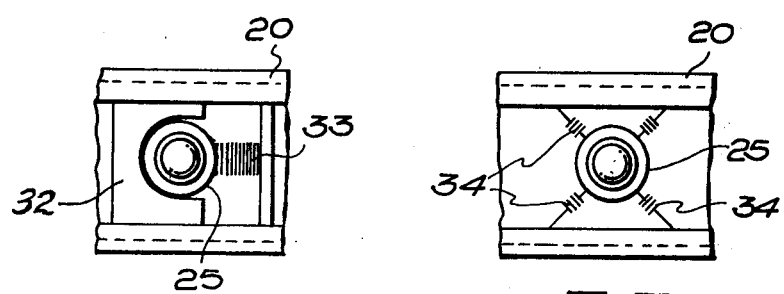
FIGS. 6 and 7 are transverse cross-sections of the ram and support on lines VI—VI and VII—VII respectively.

In order to allow for deflections and off-axial forces arising in for example bending the strap section 26 around the corner of the mould, all the rams 25 are mounted in the manner shown in FIGS. 5 to 7.

Each ram 25 has a convex end 30, which is received in a cup-shaped retainer 31. This allows swivelling of the ram in the retainer 31, which has a diverging bore towards as shown. The ram is retained between the retainer 31 and the mouldward side of the frame 20 by a guide plate 32. This has a C-shaped cut out which embraces the ram cylinder through 180°, and provides a lower surface for it to slide on under deflection. The ram 25 is biased into the cut out by a spring 33. In addition, the ram 25 is biased towards a central portion by four radial equi spaced springs 34 (FIG. 7).

This mounting of the ram 25 enables deflections and pivoting of the ram required to follow the changing orientation of the strap section 26 as the latter is pressed against the mould wall.

In a modified method the strap sections are not preformed to a 'U' shape. The mid zone of the strap in the form of a straight bar is applied against the wall of the mould under full pressure by the jack or jacks and then the other jacks are successively actuated to each side, so that the strap section is bent to shape around the mould by the successive jack actuations.

It is also possible to use four strap sections which may each be disposed to extend around one corner of the mould and halfway along the contiguous sides.

A base support member may be provided formed from a slab of concrete or other structure in the floor of a work-shop or yard.

The method according to the invention for strapping ingots moulds is expected to extend the working lives of ingot mould by a factor of approximately 1.7, so that the capital cost of the mould per casting will be approximately halved, leading to more economical casting processes.

A major factor in increasing the life of a mould is the fact that no bores or other weaknesses are introduced into the actual structure of the mould.

Because of the elimination of the need for boring several holes (between 24 and 30 in known strapping processes) the process according to the invention is relatively rapid, and also economical to carry out.

It should be explained that the strap sections are steel strips of 8 inches × ¾ inch cross section, which is why the jacks have pressures in the order of 10 to 25 tons. More massive straps would require higher jack pressures and vice versa.

I claim:

1. Apparatus for strapping ingot molds comprising a frame surrounding the base of a mold, the frame mounted on rotary means for rolling movement from place to place, and flexibly mounted hydraulic jacks or rams having plungers mounted on the frame for holding two or more non-pliable metal strap sections to the outer surface of said mold and for pressing the sections against said outer surface of said mold to lie around and conform to said outer surface in a pressure fit around said mold, and wherein each said flexibly mounted ram or jack has its end in the frame received in a cup shaped member, said end being convex, and a support plate having a semi-circular cut out located between the said end and the plunger end of said ram, the ram or jack being biased into said cut out by a spring and being further flexibly held in position by symmetrically arranged radial springs.

2. Apparatus according to claim 1 wherein the rotary means is in the form of casters.

* * * * *